United States Patent [19]
Galbraith et al.

[11] 3,753,527
[45] Aug. 21, 1973

[54] DRIP IRRIGATION SYSTEM

[75] Inventors: Lyle D. Galbraith, Redmond; Alan R. Harvey, Bellevue, both of Wash.

[73] Assignee: Rocket Research Corporation, Redmond, Wash.

[22] Filed: Aug. 6, 1971

[21] Appl. No.: 169,689

[52] U.S. Cl.................. 239/11, 239/468, 239/542, 239/547
[51] Int. Cl............................................ B05b 17/04
[58] Field of Search...................... 239/DIG. 1, 542, 239/553, 468, 11; 137/525, 513.3

[56] References Cited
UNITED STATES PATENTS

| | | | |
|---|---|---|---|
| 3,323,550 | 6/1967 | Lee | 239/468 |
| 2,650,132 | 8/1953 | Reinecke | 239/542 |
| 2,753,953 | 7/1956 | Tear | 239/542 |
| 3,586,239 | 6/1971 | Blass | 239/542 |
| 3,604,728 | 9/1971 | Symcha et al. | 239/542 |

FOREIGN PATENTS OR APPLICATIONS

| | | | |
|---|---|---|---|
| 1,171,272 | 9/1958 | France | 239/547 |

*Primary Examiner*—Lloyd L. King
*Attorney*—John O. Graybeal, Robert B. Hughes et al.

[57] ABSTRACT

A plurality of drip units or irrigators are attached to a plastic hose. Water flows from the hose to and through a relatively large metering orifice in each irrigator which is sized to easily pass any expected particles which are in the water. A vortex chamber is positioned immediately upstream of the metering orifice and functions to swirl the water ahead of the orifice, giving the orifice the flow determining characteristics of a relatively small orifice. The vortex chamber also serves to increase the velocity of the water at the orifice, providing an scouring action at the orifice working against algae buildup.

11 Claims, 12 Drawing Figures

PATENTED AUG 21 1973 3,753,527
SHEET 1 OF 2
Fig. 1.
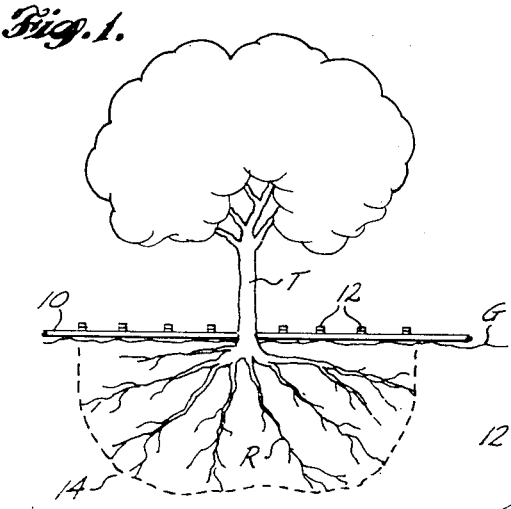
Fig. 2.
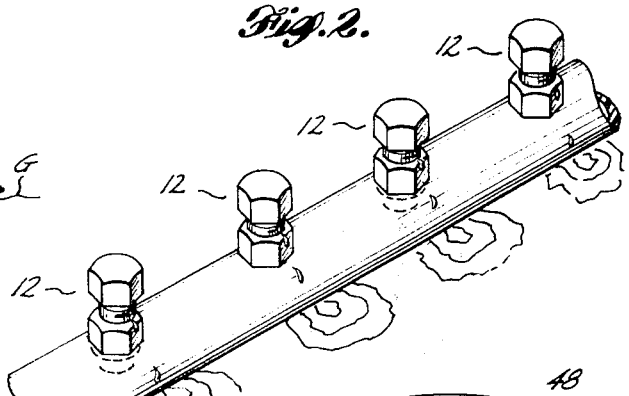
Fig. 4.
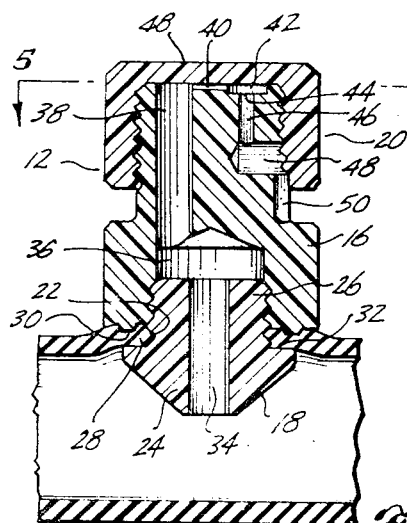
Fig. 6.
Fig. 5.
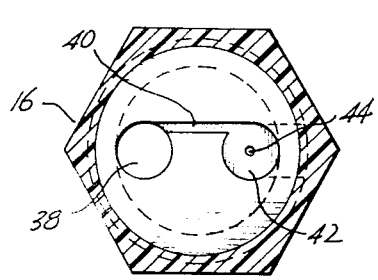
Fig. 7.
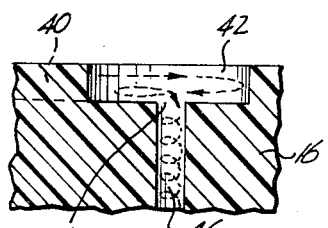
Fig. 3.
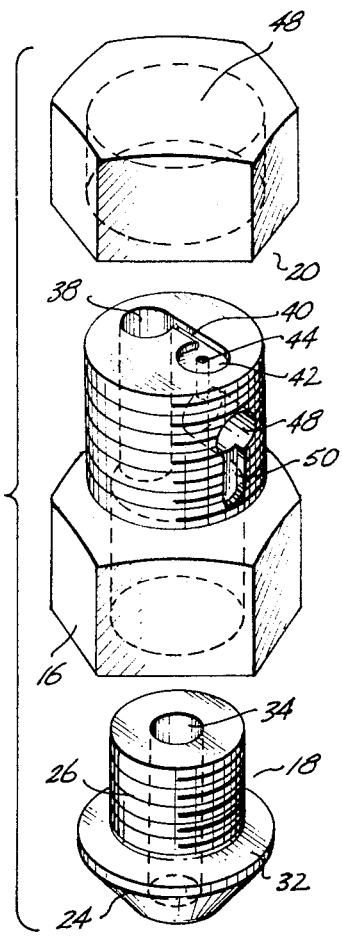
INVENTORS
LYLE D. GALBRAITH
ALAN R. HARVEY
BY Graybeal, Cole & Barnard
ATTORNEYS

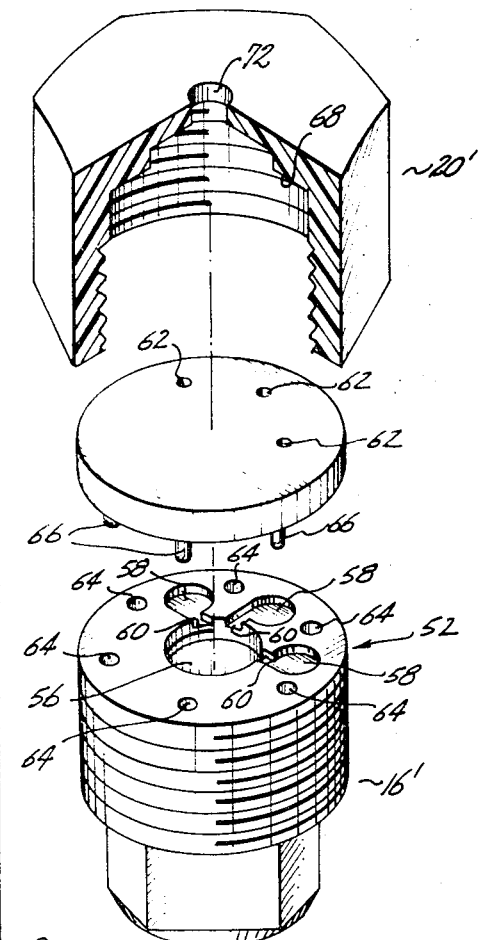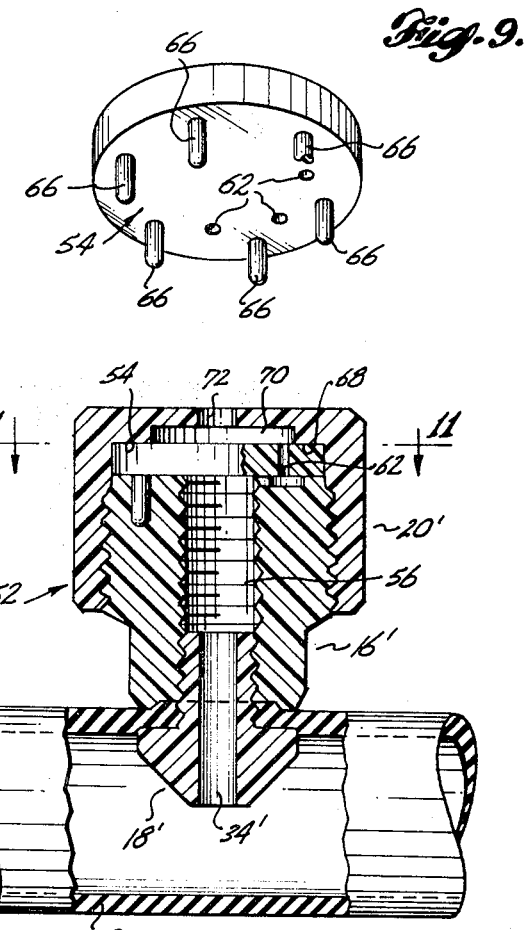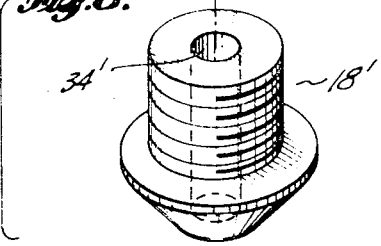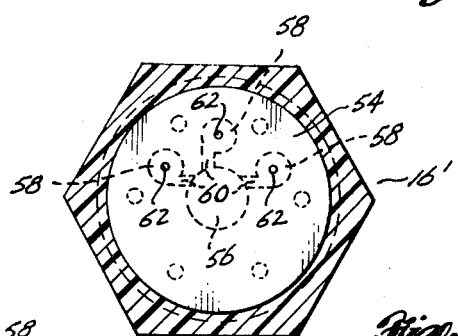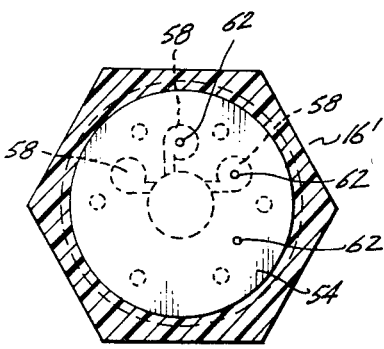

DRIP IRRIGATION SYSTEM

BACKGROUND OF THE INVENTION

1. Field of the Invention

This invention relates to improvements in the trickle or drip irrigation field, and particularly to the provision of an improved type of drip irrigator having a relatively large metering orifice, sized to easily pass the expected particles in the irrigation water, but fluidically controlled to have the metering characteristics of a relatively small orifice.

2. Description of the Prior Art

A "trickle" or "drip" irrigation system includes conduits for delivering the irrigation water in small quantities directly to the plants being irrigated. The water is merely dripped onto the soil adjacent the plant or is delivered as a very slow, steady trickle to the soil. This is done so that soil pore spaces are never completely filled with water and oxygen is always available to the plant roots and soil microbes. Examples of prior patents relating to trickle or drip irrigation systems are U.S. Pat. No. 2,752,201, granted June 26, 1956, to Ludwig Blass, and U.S. Pat. No. 3,420,064, granted Jan. 7, 1969, to Ischajahu Blass and Symcha Blass. In addition, the trickle or drip irrigation concept is fully discussed in the article "Trickle Irrigation", from the April and May 1969 issues of *Water In Australia*, published by Imperial Chemical Industries of Australia & New Zealand Limited.

Flow rates for drip irrigators are typically in the neighborhood of one gallon per hour of water at a supply pressure of about 25 pounds per square inch (25 psig). The water which is supplied to the irrigator units is typically collected from irrigation ditches and may have a high concentration of dissolved salts and/or algae therein, both of which tend to clog fixed orifice devices. Filters are used in the systems, but still some particles and algae remain in the water leaving the filter. A fixed orifice for producing a flow rate of about one gallon per hour when the supply pressure is about 25 psig would be in the neighborhood of 0.010 of an inch in diameter, which would tend to become clogged easily.

One approach to the problem of orifice clogging has been proposed by the Uni-Flow Corporation of North Ridge, California. It involves using a variable size annular orifice which is defined by a piston having an open center for receiving a tapered pin. A spring is provided for biasing the piston into a position wherein the opening initially surrounds a small diameter portion of the pin and the annular orifice is relatively large. The initial flow of water flows freely through the large orifice and washes solid particles and algae out from the unit. The pressure of the water quickly builds up and moves the piston into a position wherein the central opening surrounds a larger diameter portion of the pin and the annular orifice is equivalent in area to about a 0.010 inch diameter orifice. A disadvantage of this type of system is that it requires the use of an expensive high capacity pump, making the system unattractive from a cost standpoint and also the small annular orifice is prone to clogging. An example of a flow regulator which is similar in construction to the emitter manufactured by the Uni-Flow Corporation is shown by U.S. Pat. No. 2,960,109, granted Nov. 15, 1960, to Keith E. Wilson.

SUMMARY OF THE INVENTION

According to the present invention each irrigator unit or emitter is provided with a relatively large metering orifice of sufficient size to pass all expected particles in the irrigation water, and a vortex chamber forwardly of the orifice, functioning to effectively reduce the discharge coefficient of the orifice to the extent that the desired flow rate is obtained. The vortex chamber also adds velocity to the water enabling the water to scour the region around the orifice and prevent the buildup of algae.

According to the invention, each irrigator unit may be provided with a single control orifice and an associated vortex chamber, or may be provided with a plurality of vortex chambers and an outlet plate having both control orifices and blank spaces which are selectively alignable with the vortex chambers for varying flow through the irrigator units. Or, each irrigator unit may be provided with a single vortex chamber and an outlet plate carrying a plurality of different sized orifices which are selectively usable with the vortex chamber to cause a change in the flow rate, or a plurality of different sized vortex chambers and an outlet plate having one or more orifices which are selectively alignable with one or more of the vortex chambers, and blank spaces for closing the rest.

The present invention also relates to certain constructional details of the irrigator units and to other functional features, as will become apparent from the following detailed discussions of the illustrated embodiments.

BRIEF DESCRIPTION OF THE DRAWING

FIG. 1 is a view of a section of a drip irrigation system comprising drip irrigators of this invention, shown in relationship to a fruit tree, such view showing by a broken line the boundary of the zone being wetted by the irrigation water;

FIG. 2 is a fragmentary view on an enlarged scale of a plurality of the drip irrigators shown spaced along a hose;

FIG. 3 is an exploded isometric view of one of the irrigators;

FIG. 4 is a vertical section view taken through one of the irrigators and a portion of the hosing to which it is attached;

FIG. 5 is a cross-sectional view taken substantially along line 5—5 of FIG. 4, presenting a top plan view of the vortex chamber and the orifice it controls;

FIG. 6 is an enlarged scale view of the vortex chamber, including arrows for indicating flow;

FIG. 7 is an axial sectional view of the vortex chamber and a portion of the control orifice, also including flow indicating arrows;

FIG. 8 is a view similar to FIG. 3, but of a modified form of drip irrigator which includes means for adjusting the amount of flow through the irrigator;

FIG. 9 is an isometric view looking up towards the lower side of a control member portion of the irrigator shown by FIG. 8;

FIG. 10 is a view similar to FIG. 4, but of the type of irrigator shown by FIG. 8;

FIG. 11 is a view similar to FIG. 5, but taken substantially along line 11—11 of FIG. 10, and showing all three control orifices in the control member in registry with all three vortex chambers; and FIG. 12 is a view similar to FIG. 11, but showing only two of the control orifices in communication with only two of the vortex chambers.

DESCRIPTION OF THE PREFERRED EMBODIMENT

Referring to FIG. 1, a distribution conduit or hose 10 is shown lying on the ground G adjacent a tree T. A plurality of dripper units or irrigators 12 are spaced along the conduit 10. In use the water emitted from the units 12 wets the ground G around the tree roots R substantially within the boundaries of the broken line 14.

It is the intent of FIGS. 1 and 2 of the drawing to merely show that the system comprises a conduit 10 which is equipped with a plurality of irrigators or dripper units 12. It is to be understood that the number and spacing of the irrigators 12 are variables and the illustrated number and spacing of such units 12 are not to be considered critical or even accurate.

Referring specifically to FIGS. 3–7, each dripper unit 12 comprises a body 16, a fastener element 18, and a cap 20.

The illustrated embodiment of the dripper unit 12 is adapted to be secured to a flexible wall type conduit 10, e.g. a plastic hose. An opening 22 is cut or otherwise formed in a side wall of the hose 10 for each unit 12. The tapered enlarged inner end portion 24 of the fastener element 18 is worked through the opening 22 until it is inside the hose 10 and the threaded upper end portion 26 of element 18 projects outwardly from the hole 22. The body member 16 is screwed onto the outstanding portion 26 until the hose material 28 (FIG. 4) immediately bordering the opening 22 is firmly clamped between the lower end surface 30 of body member 12 and the angular shoulder 32 on fastener element 18.

Fastener element 18 includes an axial passageway 34 through which water flows outwardly from the conduit 10. The body member 12 may have a cavity 36 for receiving the water from passageway 34, and an axial passageway 38 leading upwardly from cavity 36 to a tangential inlet 40 for a vortex chamber 42. Together passageway 34, cavity 36 and passageway 38 form what may be termed a "trunk passageway" leading from the inner to the outer end of the unit 12. A control orifice 44 is located at the lower center of vortex chamber 42. It forms the entrance to an axial passageway 46 which communicates with a lateral outlet passageway 48. Passageway 48 serves as a communication port with the surroundings and also tends to break up the spray pattern established by the vortex orifice. It may be termed a "settling chamber". This settling chamber 48 has a relatively large volume and in it the velocity is reduced to about zero.

In preferred form, the tangential inlet passageway 40 and the vortex chamber 42 are formed as recesses in the upper end portion of the body member 16. When cap 20 is installed its end wall 48 provides an upper boundary for both passageway 40 and vortex chamber 42 (see FIG. 4).

Cap 20 and the upper end portion of the body 16 may be provided with complementary threads, as illustrated, so that the cap 20 may be merely screwed onto the body 16. Alternatively, the cap 20 may be secured to the body member 16 in some other fashion, such as by use of a suitable adhesive, or by a snap-on type connector.

In the illustrated embodiment a portion of the cap 20 extends downwardly over the outer end of passageway 46, and a short channel 50 is formed in the threaded portion of body member 16 to provide an outlet path for the water. Alternatively, the cap 20 may be shortened so that no portion of it extends over the outlet for passageway 46.

It is contemplated that the three components 16, 18, 20 of each dripper unit 12 will be fabricated from a suitable plastic or other inexpensive and noncorrodible material. It is also contemplated that the distribution conduit 10 will be fabricated from a flexible plastic material such as polyvinyl chloride or polyethylene, for example.

The complete system of which conduit 10 is a part includes a filter (not shown) which both mechanically removes particles from the water and chemically fights algae. The various passageways and orifices in each irrigator, including inlet 40, orifice 44, and passageways 46 and 50, are sized to freely pass any particles remaining in the water. As a fixed orifice standing alone the main flow control orifice is sized to pass a greater than desired flow for the typical pressure (viz. about 25 psig) encountered. However, according to the invention the vortex generating chamber 42 is employed to effectively reduce the discharge coefficient of the orifice 44. Thus, each irrigator 12 includes a relatively large metering orifice of a size to easily pass any expected particles which are in the water, but which has the flow determining characteristics of a small orifice.

Referring to FIG. 6, water is delivered by the inlet passageway 40 tangentially to the periphery of the chamber 42, thus establishing a vortex action around the orifice 44. Due to a conservation of angular momentum, the velocity of the water at any point in the vortex is essentially $V = V_o(r_o/r)$, where $V_o$ is the tangential inlet velocity, $r_o$ is the radius of the vortex chamber and $r$ is the radius at the point in question. This indicates that as the flow progresses towards the center of the vortex chamber 42 the velocity increases greatly. Again considering conservation of energy, i.e.

$(P_o/w) + (V_o/2g) = (P/w) + (V^2/2g)$ it becomes evident that the static pressure decreases as the flow progresses toward the outlet orifice 44, resulting in a relatively low static pressure at the orfice 44, tending to lower the outlet flow rate. This allows the sizes of the passageways through the irregator to be maximized, for reducing clogging, while maintaining a low flow rate. Also, the velocities experienced in the vortex chamber are of a relatively large magnitude and works against algae buildup. Further, since the unit 12 has no moving parts for metering flow, there is no danger of a breakdown in the metering function because a moving part became stuck in position and ceased to function.

Referring now to FIGS. 8–12, the adjustable irrigator 52 shown thereby comprises a body member 16', a fastener element 18', a cap 20', and a control member 54. Fastener element 18' is like fastener element 18. As shown by FIG. 10, element 18' cooperates with the lower portion of body member 16' in the same manner as part 18 with body 16 to firmly clamp the irrigator 52 onto a section of hose 10. As best shown by FIG. 10, the central passageway 34' of fastener element 18' discharges into the larger diameter center passageway 56 formed axially through body member 16'.

In this embodiment a plurality of vortex chambers 58 are formed as recesses in the outer end of body member 16', and each includes a tangential inlet 60 (FIGS. 8, 11 and 12). The insert member 54, herein sometimes referred to as the control member, may include a separate axial control orifice 62 for each vortex chamber 58. The orifices 62 are spaced apart in accordance with the spacing of the centers of the vortex chambers 58 so that the member 54 can be placed over the outer end of body member 16' and the orifices 62 matched up with the centers of the vortex chambers 58. To make precise alignment possible, a plurality of axial sockets 64 are formed in the outer end portion of body member 16' and a like number of locator pins 66 are provided on the control insert 54.

In the embodiment illustrated by FIGS. 8–12, three vortex chambers 58 are provided and their centers are spaced 60° apart, i.e. the outer end of body member 16' is divided into six parts. The portion of control member 54 diametrically opposite the vortex chambers 58 is provided with a continuous blank space. Body member 16' is provided with six locator sockets 64 and the control insert 54 is provided with six locator pins 66.

Referring now to FIG. 11, the control insert 54 may be positioned relative to body member 16', by a proper matching of the locator pins 66 with the locator sockets 64, so that a control orifice 62 is associated with each of the three vortex chambers 58. Alternatively, the control insert 54 could be rotated either 60° (FIG. 12) or 120° (not shown) in position from the position shown in FIG. 11 so that either two or only one of the vortex chambers is provided with a control orifice 62. In this manner, the flow through the irrigator 52 can be regulated. The vortex chamber or chambers 58 having no orifice is effectively closed and rendered nonfunctional by a blank portion of the member 54.

By way of a typical and therefore nonlimitive example, each control orifice 62 may be designed to provide a flow rate of 1 gallon per hour. With respect to the irrigation of fruit trees, 1 gallon per hour usually provides enough water and 2 gallons per hour is not an excessive amount. Thus, the control disc 42 would be rotated so as to place two of the control orifices 62 in registry with two of the vortex chambers 58 (see FIG. 12). Then in the event that one of the orifices 62 became plugged, sufficient irrigation water would be delivered by the second orifice 62. It is believed that the chances of two orifices 62 for any irrigator 52 becoming clogged before the condition is detected by a workman is relatively remote. An advantage of locating the control orifices 62 in a removable member 54 is that it permits easy cleaning of a plugged orifice. The cap 20' need merely be unscrewed, the member 54 removed, and a pin or other like object inserted through the plugged orifice to clean it out.

Further modifications of an adjustable irrigator unit include providing the body member with but a single vortex chamber and a control member like that shown having a plurality of different diameter control orifices which may be selectively placed in registry with the vortex chamber. Or, the body member may be provided with a plurality of different sized vortex chambers and the control member with a plurality of control orifices having the same or different diameters, and the irrigator adapted to be used by placing only a single selected one of the control orifices into registry with a single selected one of the vortex chambers, with blank places on the control member serving to close the remaining vortex chambers, removing them from the flow path leading from the trunk passageway in the body member to the outlet from the irrigator.

Referring again to FIGS. 8 and 10, the cap 20' is shown to have a shoulder 68 which bears down on the control insert 54 and urges the lower surface of member 54 into sealing contact with the regions of the upper end of the body member between and around the vortex chambers 58. A cavity or settling chamber 70 is provided in the center region of the cap 25 and is such a diameter that it extends outwardly beyond the control orifices 62. A single outlet opening 72 of substantial diameter extends from cavity 70 outwardly of the irrigator 52. In use, the water from the control orifices 62 which are being used flows into the cavity 70 and therefrom out through the outlet orifice 72, and drips on the ground.

Having now described several embodiments of the invention, and the manner in which they are to be used, the invention itself will be defined by the following claims.

What is claimed is:

1. A drip irrigator comprising means for attaching it to the side wall of a conduit, said irrigator including a vortex chamber having a tangential inlet, an axial control orifice leading from said vortex chamber, and outlet passageway means leading from said control orifice to a relatively large volume settling chamber and from said chamber outwardly from said irrigator to discharge onto the ground, whereby liquid supplied to the irrigator swirls as it flows through the vortex chamber and in that manner limits the flow through the control orifice, said vortex chamber and said control orifice being dimensioned to limit the flow through the control orifice to such an extent that the liquid substantially only drips or trickles out from the settling chamber.

2. A drip irrigator according to claim 1, wherein said irrigator comprises a body having first and second ends and means at its first end for securing it to the side wall of the conduit, wherein a trunk passageway extends through the body from said first end to the tangential inlet for the vortex chamber, wherein said vortex chamber and its tangential inlet are both recesses in the second end of the body, and wherein said irrigator includes a removable member having a wall which when in place provides an outer boundary for both the tangential inlet and the vortex chamber.

3. A drip irrigator according to claim 2, wherein said outlet passageway means extends from said control orifice longitudinally of the body, and said settling chamber extends laterally of said body and exits through a side portion of said body.

4. A drip irrigator according to claim 3, wherein said trunk passageway extends to the second end of said body and the tangential inlet for the vortex chamber extends laterally from said trunk passageway to said vortex chamber.

5. A drip irrigator according to claim 1, wherein said irrigator is formed to include a plurality of vortex chambers, each having a tangential inlet for receiving a liquid, and selectively usable means for supplying each vortex chamber with either an axial control orifice or a downstream closure.

6. A drip irrigator comprising a body having a generally planar downstream end, a trunk passageway extending therethrough to said downstream end, vortex chamber formed as a recess in said downstream end, said vortex chamber having a generally tangential inlet extending laterally to it from said trunk passageway, and a wall member placeable against said outlet end to form an outer boundary for said vortex chamber, said member including at least one control orifice and at least one blank portion which are selectively locatable over or to one side of the vortex chamber.

7. A drip irrigator according to claim 6, comprising a plurality of said vortex chambers having centers which are spaced apart angularly about the longitudinal center axis of said body, and said wall member has extending therethrough a control orifice for each vortex chamber, said control orifices also being spaced apart angularly about the center of said wall member, and means for securing said wall member to said body member with one or more of the control orifices in registry with the vortex chambers.

8. A drip irrigator according to claim 7, wherein the means for securing the wall member to the body member includes a cap having a center cavity for receiving the wall member and downstream end of the body, said cap including outlet passageway means therein leading from the discharge ends of the control orifices outwardly from the drip irrigator.

9. A drip irrigator according to claim 7, further comprising complementary pin and recess means on said wall member and the downstream end of said body for positioning the wall member with either a control orifice or a blank portion of the wall member in registry with each vortex chamber.

10. A drip irrigation method comprising delivering water tangentially into a vortex chamber, then through such chamber and through a control orifice leading generally axially therefrom, and then through an outlet to a relatively large volume settling chamber, and on to the ground to be irrigated, including swirling the water substantially as it flows through the vortex chamber so that the swirling water will limit flow out through the control orifice to the extent that the water substantially merely drips or trickles from the settling chamber onto the ground.

11. A drip irrigation method according to claim 10, comprising adjusting the amount of water dripped onto the ground by varying the number of vortex chambers and control orifices in the flow path leading to the settling chamber.

* * * * *